Feb. 2, 1965   R. W. NASHOLD ETAL   3,168,001
HEADSTOCK SPINDLE ADJUSTMENT MECHANISM
FOR SPIRAL MILLING MACHINE
Original Filed Dec. 19, 1958   4 Sheets-Sheet 1

INVENTORS
ROBERT W. NASHOLD
HERMAN J. BALDWIN
VINCENT L. MITCHELL

BY
Howard S. Keiser
& John F. Verhoeven
ATTORNEYS

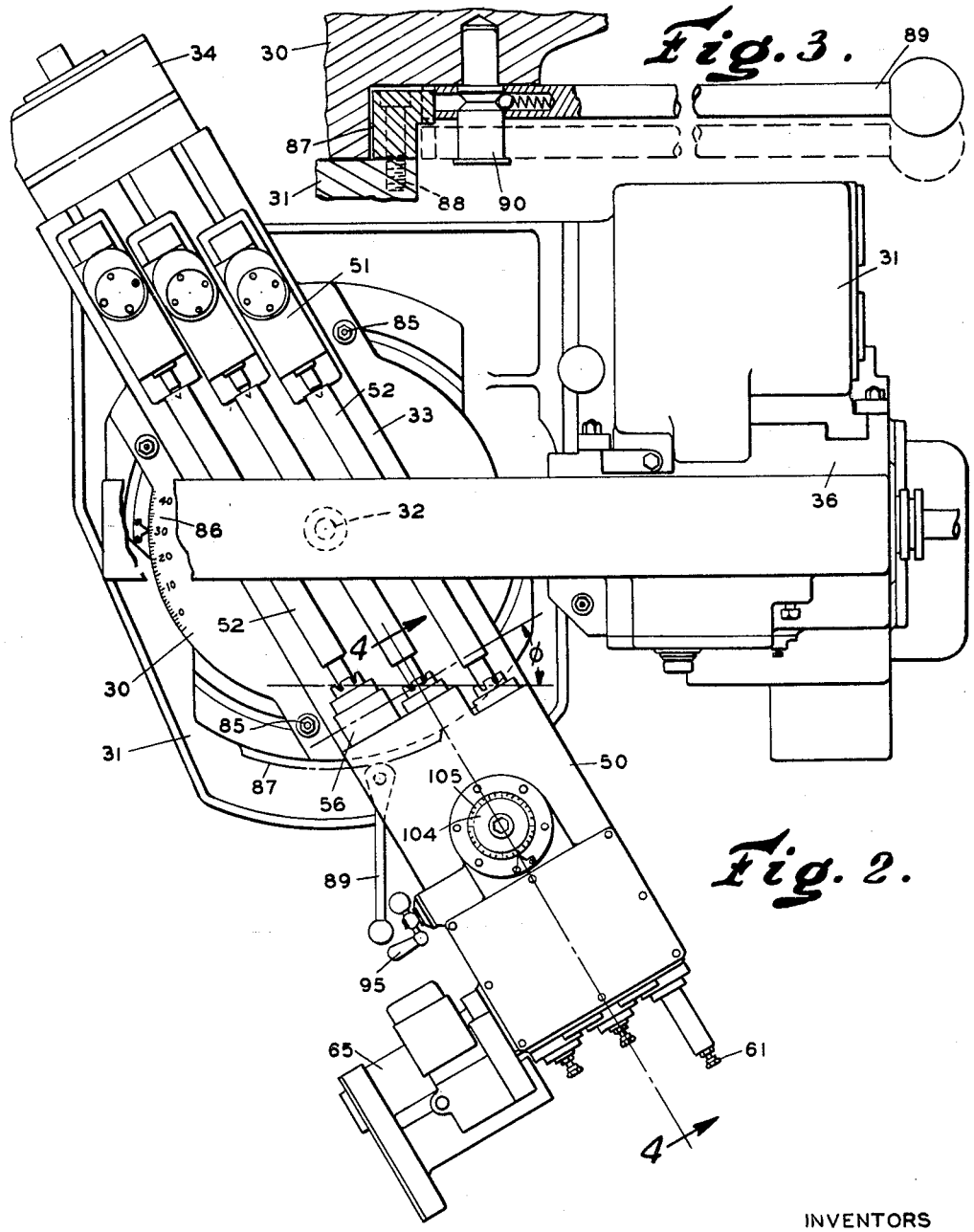

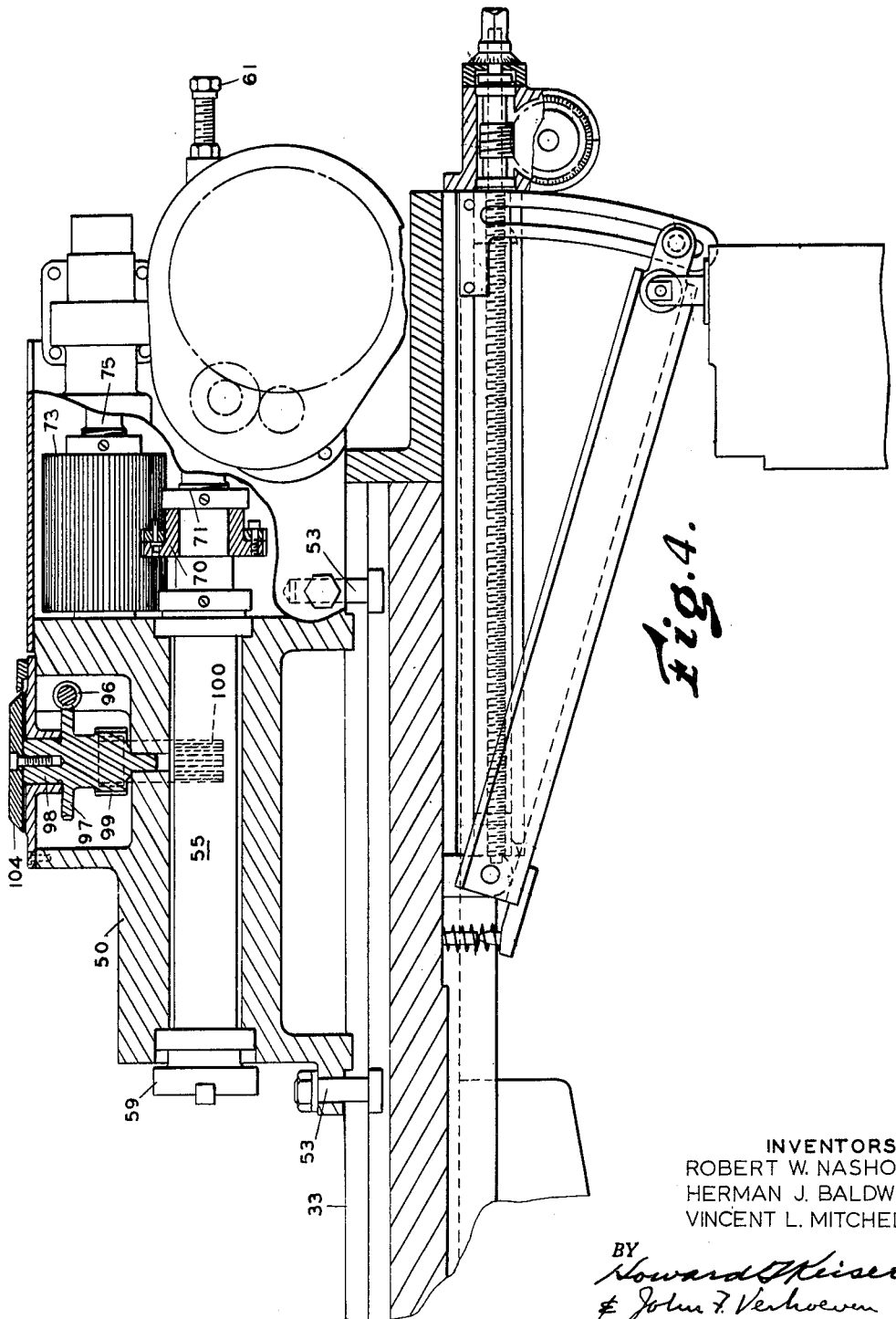

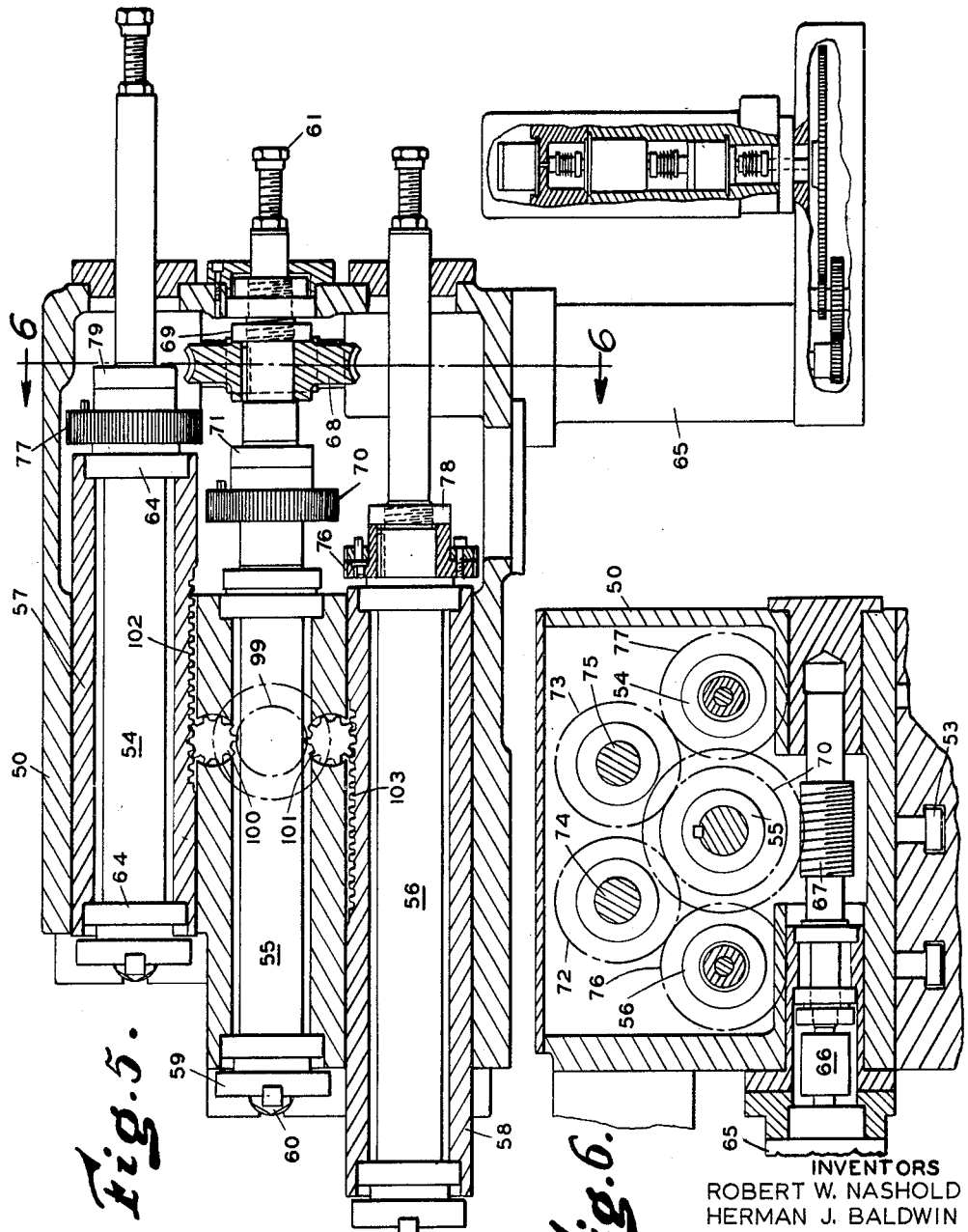

United States Patent Office 3,168,001
Patented Feb. 2, 1965

3,168,001
HEADSTOCK SPINDLE ADJUSTMENT MECHANISM FOR SPIRAL MILLING MACHINE
Robert W. Nashold, New Richmond, and Herman J. Baldwin and Vincent L. Mitchell, Cincinnati, Ohio, assignors to The Cincinnati Milling Machine Co., Cincinnati, Ohio, a corporation of Ohio
Original application Dec. 19, 1958, Ser. No. 781,747, now Patent No. 3,101,649, dated Aug. 27, 1963. Divided and this application Apr. 26, 1963, Ser. No. 289,150
5 Claims. (Cl. 90—11.48)

This application is a division of copending patent application Serial No. 781,747 filed December 19, 1958, now Patent No. 3,101,649 granted August 27, 1963, for Spiral Milling Machine.

This invention relates to a machine for generating spiral flutes in the production of drills, reamers, counterbores, milling cutters and other parts requiring the formation of helical or spiral flutes.

The cutting tool is supported by a spindle carrier which is mounted for sliding movement on the bed of the machine. The helix angle of the flutes is determined by the angular setting of a saddle pivoted on the fixed bed of the machine. A work supporting table is guided for longitudinal sliding movement on the saddle and the work is supported for rotation about its longitudinal axis in a fixture carried by the table. The fixture is provided with one or more headstock spindles which are rotated under the control of the lead tracer to cause the work to be rotated in synchronism with the longitudinal movement of the table. Where more than one headstock spindle is utilized, provision is made for displacing the spindles axially in accordance with the helix angle of the flutes so as to align the starting positions of the flutes on each of the workpieces. By this means, each cutter will make contact with a corresponding point on each of the workpieces so that each cut will start and stop at the same place on each workpiece. The longitudinal displacement of the spindles is effected by a manually settable dial which simultaneously adjusts the headstock quills to the proper locations for the selected helix angle which is also applied to the table by means of the swiveling saddle.

Accordingly, it is an object of the present invention to provide a machine for cutting spiral flutes of varying leads and tapers on workpieces of varying shapes and sizes.

Another object of the invention is to provide a direct reading dial for adjusting the displacement of the headstock spindles in accordance with the selected helix angle of the flutes which is also applied to the swivel saddle.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 2 is a plan view of the same machine.

FIG. 3 is a cross sectional view showing the hand lever for swiveling the saddle.

FIG. 4 is a cross sectional view taken along the line 4—4 in FIG. 2 to show the construction of the headstock and the dial mechanism for the lead cam.

FIG. 5 is a horizontal sectional view showing the adjusting means for the headstock spindles.

FIG. 6 is a cross sectional view taken along the line 6—6 in FIG. 5.

In the following description, similar reference characters are used to designate similar or identical elements and portions throughout the specification and throughout the different views of the drawings.

Figure 1:
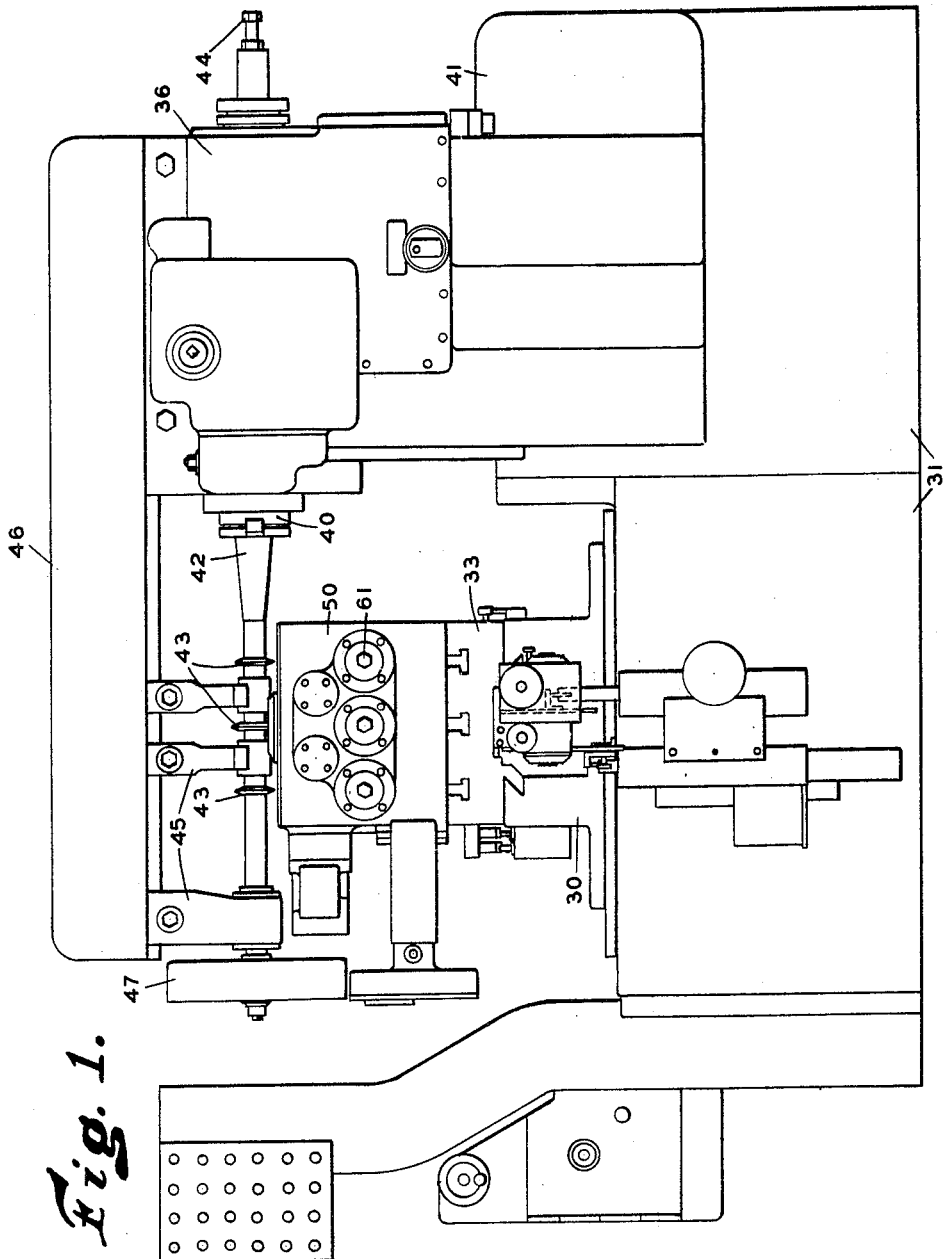
FIG. 1 is a right hand end view of a spiral milling machine constructed in accordance with the present invention.

The invention is shown herein as applied to a fixed bed type milling machine which is especially suited to the automatic production of spiral fluted parts. It will be recognized, however, as the description proceeds, that the invention could be applied to other types of milling machines with equally satisfactory results.

Machine tool structure

In FIGS. 1 to 3, inclusive, of the present drawings there is shown a fixed bed type production milling machine in which a saddle 30 is mounted for pivotal movement on the bed 31 by means of a pivot bolt or stud 32 (FIG. 3). The saddle is provided on its upper surface with dovetail ways for receiving and guiding a table 33 for rectilinear movement on the saddle. Traversing movement of the table on the saddle is effected by a hydraulic motor 34 mounted on the left hand end of the table. This motor drives a lead screw which meshes with a nut fixed to the saddle whereby rotation of the feed screw will cause traversing movement of the table on the saddle.

The rear portion of the bed 31 is provided with an upstanding column on which a spindle carrier 36 is supported for vertical sliding movement by means of suitable ways provided on the bed. Movement of the spindle carrier along the ways is effected by means of a hydraulic cylinder having a piston rod connected to the carrier 36 to raise and lower the carrier as hydraulic fluid is admitted to one end or the other of the cylinder.

Referring again to FIG. 1, the carrier 36 is fitted with a spindle 40 which is arranged to be driven by a motor 41 through a conventional transmission housed within the spindle carrier. An arbor 42, on which are mounted cutters 43, is attached to the spindle 40 and held securely therein by a drawbolt 44. The arbor 42 is supported along its length by arbor supports 45 which are mounted on an overarm 46 attached to the spindle carrier 36. A fly wheel 47 may be mounted on the cutter end of the arbor 42 to smooth out the impulses resulting from contact of the individual teeth of cutters 43 with the work.

Work fixture

The parts to be milled are supported on the table 33 by means of a work fixture shown in FIGS. 2, 4, 5 and 6.

The workpieces 52 to be machined are supported between centers by a headstock 50 and tailstocks 51 to permit rotation of the work as the table is traversed along the saddle, and also to permit indexing of the workpieces after each flute has been cut therein. For this purpose the headstock, which is arranged to be secured by bolts 53 to the table 33 (FIG. 4), is fitted with as many spindles as there are workpieces to be machined on each operation of the machine tool. In the present embodiment of the invention, the machine is adapted to mill flutes in three workpieces 52 simultaneously and, accordingly, the headstock 50 is provided with 3 spindles 54, 55, and 56. As shown in FIG. 5, the center spindle 55 is journaled in the headstock frame without any provision for endwise shifting of this spindle. The spindles 54 and 56, however, are arranged for axial displacement and to this end are journaled in quills 57 and 58, respectively, which are in turn mounted for longitudinal sliding movement in the headstock. Each spindle is provided with a standard spindle nose 59 which supports a suitable work driver or chuck 60 for supporting one end of each of the workpieces and for driving the work as the spindle is rotated. Each spindle is preferably of hollow construction and provided with a drawbolt 61 for holding the work in the chuck.

As shown in FIG. 5, each spindle is journaled for rotation in bearings 64 and all of the spindles are arranged to be rotated simultaneously in the same direction by a hydraulic motor 65 mounted on the side of the headstock. As shown in FIG. 6, the shaft of the hydraulic motor is connected through a coupling 66 with a worm 67 which is journaled for rotation in the headstock. The worm 67 meshes with a worm wheel 68 (FIG. 5) which is received on a reduced portion of the spindle 55. The worm wheel is connected to the spindle 55 by a key and is held in place by a nut 69 meshing with threads formed on the spindle. The spindle 55 also has keyed thereto a spur gear 70 which is held in place by a nut 71. As shown in FIGS. 4 and 6, the gear 70 meshes with a pair of wide faced idler gears 72 and 73 which are mounted on shafts 74 and 75 journaled for rotation in the headstock. The idler gears 72 and 73 in turn mesh with spur gears 76 and 77 which are keyed to the spindles 56 and 54, respectively being held in place thereon by nuts 78 and 79. Accordingly, if the central spindle 55 is rotated clockwise as viewed in FIG. 6, the idler gears 72 and 73 will be rotated counter-clockwise thereby rotating the spindles 54 and 56 clockwise. Since the gears 70, 76 and 77 are of the same pitch diameter, the spindles all will rotate at the same speed and effect synchronous rotation of the workpieces.

As mentioned earlier herein, the saddle 30 is arranged to be swiveled on the base 31 to permit a desired helix angle to be selected. Thus, by releasing bolts 85 (FIG. 2), the saddle may be swung about the pivot stud 32 to set any desired helix angle from zero degrees to approximately 40 degrees as indicated by a scale 86 provided on the saddle. To assist the operator in adjusting the saddle to the desired angular position, a segmental rack 87 is secured to the bed of the machine by screws 88 as shown in FIG. 3. A hand lever 89 is pivotally supported on a stud 90 depending from the bottom of the saddle. The inner end of the lever 89 is formed with rack teeth adapted to mesh with the teeth of the rack 87. The hand lever is held in raised or meshing posiiton, as shown in full lines in FIG. 3, by a spring pressed ball in the hand lever which cooperates with a detent groove in the stud 90. In this position of the hand lever, the teeth on the lever cooperate with the rack teeth 87 and by rotating the hand lever the saddle may be moved a short distance in either direction. By lowering the hand lever to disengage it from the rack teeth, as shown in the dotted outline position in FIG. 3, the lever may be then swung in the opposite direction and again raised to the full line position for engagement with the rack teeth to move the saddle a further increment in the desired direction. After the saddle has been accurately positioned as indicated by the scale 86, the bolts 85 may be tightened to clamp the saddle in the adjusted position.

In order to correctly align the workpieces with the cutters when the table is in an inclined position with respect to the arbor 42, it is necessary to displace the spindles 54 and 56 with respect to the center spindle 55 as indicated in FIG. 2. For this purpose the headstock is provided with a handcrank 95 which turns a worm 96 (FIG. 4) meshing with a worm wheel 97. The worm wheel is formed on a shaft 98 which is journaled at its upper and lower ends in the headstock frame. Also formed on the shaft 98 is a spur gear 99 which meshes with gear teeth formed on the upper ends of pinions 100 and 101 (FIG. 5). The lower ends of the pinions mesh with rack teeth 102 and 103 formed in the quills 57 and 58, respectively, whereby rotation of gear 99 will cause displacement of the quills in opposite directions. A dial 104 provided with graduations 105 (FIG. 2) is secured to the upper end of the shaft 98 to indicate the displacement of the quills. The scale 105 is desirably groduated in degrees from zero to approximately 40 degrees corresponding with the graduations on the saddle. Thereby, the dial 104 may be set by the handcrank 95 until the setting thereof corresponds to the degree setting of the scale 86 on the saddle. The quills 54 and 56 will then be displaced the proper distance to cause the cutters 43 to engage the workpieces 52 at corresponding longitudinal positions thereon so that the flutes will start at the same locations on each of the three workpieces. In FIG. 2, the saddle is shown set to a helix angle of 30 degrees and when the dial 104 is turned by the handcrank 95 to read 30 degrees on scale 105 the angle $\phi$ made by a line drawn through the chucks with a line drawn through the chuck of the center spindle and perpendicular to the axis of the spindle will likewise be 30 degrees.

Although the invention has been described in connection with one possible form or embodiment thereof, and certain specific terms and language have been used herein, it is to be understood that the disclosure is illustrative rather than restrictive and that changes and modifications may be resorted to without departing from the spirit of the invention as defined by the claims which follow.

What is claimed is:

1. In a machine for producing longitudinally extending spiral flutes simultaneously on a plurality of workpieces, said machine having a bed, a swiveling saddle on said bed, a slide on said saddle, means including a plurality of longitudinally adjustable spindles on said slide for rotatably supporting the workpieces in parallel relationship on the slide, and a plurality of cutting tools supported for rotation about a common axis on said bed for cutting a flute in each of said workpieces, the invention comprising means for swinging said saddle to position the axes of said spindles at an angle with respect to said cutting tools corresponding to the helix angle of the flutes to be cut in the workpieces, and means for simultaneously adjusting each of said spindles longitudinally along said slide to maintain said spindles in proper alignment with said cutting tools to enable the tools to cut corresponding flutes in each of said workpieces.

2. The machine of claim 1 wherein said simultaneous adjusting means includes a manipulable member, and a dial operatively connected with said member for indicating the longitudinal adjustment of said spindles in terms of the helix angle of the flutes to be cut in the workpieces.

3. The machine of claim 2, including a worm connected with said manipulable member for rotation thereby, a worm wheel meshing with said worm, and driving connections extending from said worm wheel to said spindles and to said dial for causing said dial to be rotated in synchronism with the longitudinal adjustment of said spindles.

4. The machine of claim 1 including a series of meshing gears for causing simultaneous longitudinal adjustment of said spindles on said slide, and a dial operatively connected with said gears for indicating the longitudinal adjustment of said spindles in terms of the helix angle of the flutes to be cut in the workpieces.

5. The machine of claim 4 including a dial for indicating the angular position of said saddle in terms of the helix angle of the flutes which are to be cut in the workpieces.

References Cited in the file of this patent
UNITED STATES PATENTS

| | | |
|---|---|---|
| 1,454,181 | Muller | May 8, 1923 |
| 1,774,692 | Armitage | Sept. 2, 1930 |
| 1,972,818 | Romaine et al. | Sept. 4, 1934 |